(12) United States Patent
Inoue et al.

(10) Patent No.: US 6,784,414 B2
(45) Date of Patent: Aug. 31, 2004

(54) PROBE OPENING FABRICATING APPARATUS, AND NEAR-FIELD OPTICAL MICROSCOPE USING THE SAME

(75) Inventors: Tsutomu Inoue, Hachioji (JP);
Fuminori Sato, Hachioji (JP);
Yoshihito Narita, Hachioji (JP)

(73) Assignee: Jasco Corporation, Tokyo (JP)

( * ) Notice: Subject to any disclaimer, the term of this patent is extended or adjusted under 35 U.S.C. 154(b) by 29 days.

(21) Appl. No.: 10/208,749

(22) Filed: Aug. 1, 2002

(65) Prior Publication Data

US 2003/0038233 A1 Feb. 27, 2003

(30) Foreign Application Priority Data

Aug. 22, 2001 (JP) .......................................... 2001-251784
Dec. 26, 2001 (JP) .......................................... 2001-393479

(51) Int. Cl.$^7$ ................................................ H01J 40/14
(52) U.S. Cl. ........................................ 250/216; 250/306
(58) Field of Search ................................. 250/216, 234, 250/306, 307, 201.3; 73/105

(56) References Cited

U.S. PATENT DOCUMENTS 6,617,569 B2 * 9/2003 Narita et al. ................. 250/216
2001/0048068 A1 12/2001 Narita et al.

* cited by examiner

*Primary Examiner*—Kevin Pyo
(74) *Attorney, Agent, or Firm*—Oliff & Berridge, PLC

(57) ABSTRACT

An opening fabricating apparatus for creating an opening with desired dimensions at a mask tip of a near-field optical microscope, and a near-field optical microscope using the same are provided. The apparatus comprising: a light source 116; reflection means 140; light detection means 124; press means 128, 130 pressing a probe tip against said reflection means; storage means 142; calculation means 144 figuring out the quantity of light of the reflected light for the acquisition of said opening with desired dimensions from the calibration information stored in said storage means; and press control means 126 controlling pressing of said probe tip against said reflection means so as to allow the quantity of light of said reflected light to become equal to the quantity figured out by said calculation means. The probe opening fabricating apparatus is capable of readily fabricating an opening of desired dimensions with a high reproducibility.

5 Claims, 19 Drawing Sheets

(A)

(B)

(A)

incident light
introducing side sample side (B)        incident light
           introducing side sample side

PROBE OPENING FABRICATING APPARATUS, AND NEAR-FIELD OPTICAL MICROSCOPE USING THE SAME

RELATED APPLICATIONS

This application claims the priority of Japanese Patent Application No. 2001-251784 filed on Aug. 22, 2001 and 2001-393479 filed on Dec. 26, 2001, which are incorporated herein by reference.

FIELD OF THE INVENTION

The present invention relates generally to a probe opening fabricating apparatus and a near-field optical microscope using the same, and more particularly to an improved technique for controlling the dimensions of an opening at the tip of a probe.

BACKGROUND OF THE INVENTION

Typical microscopes are capable of observing infinitesimal or ultrafine sites of a sample in a non-contact and non-destructive manner, and through connection with a spectrochemical analyzer, etc., have the ability to analyze not only the geometry and structure of an object to be observed but also its components, etc., allowing applications in a wide variety of fields.

The common optical microscopes are, however, incapable of observing objects smaller than the wavelength of light, posing a limit to its resolution. The reason is that light has a diffraction limit and hence could merely observe objects up to the wavelength used.

It is a near-field optical microscope using a probe which has a minute opening of the order of some tens to hundreds of nanometers for example that makes possible the observation in an ultrafine region beyond the diffraction limit.

FIG. 1 is a schematic representation of a near-field optical microscope. The near-field optical microscope is generally designated at 10 and performs the measurement of a sample as follows. A minute sample 12 to be measured is placed on a flat substrate 14. When a light bean 18 from a light source 16 impinges on a sharpened probe 22, evanescent light 20 emerges from an opening having a diameter less than the light wavelength at the tip of the probe 22, The evanescent light 20 is localized within a region having distances less than the light wavelength from the surfaces at and near the probe tip.

At that time, if the sample surface is brought into contact with the field of the evanescent light 20 appearing on the surfaces of the probe 22, as the result of the tip of the probe 22 coming closer to the sample surface, the evanescent light 20 will scatter outside the sample surface. Part of the scattered light 21 enters the interior of the probe 22 and is directed via a beam splitter 19 and through a spectrometer 38 to a detector 24, for data processing by a computer 26.

Thus, a stage 30 is displaced by a stage controller 28 associated with the computer 26, and a surface to be measured of the sample 12 is scanned while controlling the vertical distance between the tip of the probe 22 and the sample 12 so as to keep constant the intensity of the scattered light 21 detected by the detector 24, whereby unevenness of the sample surface can accurately be measured without contacting the sample 12. The component analysis also becomes feasible by detecting fluorescence, Raman light, etc., from the sample excited by the evanescent light 20.

The near-field optical microscope has some measurement modes. The above measurement mode is called "illumination-collection mode" which is one of representative measurement modes superior in resolution, etc., in which incident light directed via the interior of the probe to its tip is illuminated, through the opening, on the sample as the field of evanescent light (illumination), after which scattered light having information on the sample is again directed via the minute opening at the tip into the interior of the probe, for detection (collection).

The other measurement mode for use in the measurement can be "illumination mode" in which incident light directed via the interior of the probe to its tip is illuminated, through the opening, on the sample as the field of evanescent light, the resultant scattered light being directed via an external optical system including lenses, etc., to the detector to effect the detection.

Any microscopic regions beyond the diffraction limit can thus be measured by using as measurement light the evanescent light localized within a region having distances less than the light wavelength from the surfaces at and near the probe tip.

"Collection mode" measurement is also carried out in which light is irradiated from the side (substrate 14 side) opposite to the sample surface to be measured so as to generate an evanescent light field in the vicinity of the sample surface to be measured, with the probe tip being brought into contact with this field to thereby scatter the evanescent light field, the resultant scattered light being collected via the opening at the probe tip, for detection.

The probe 22 as shown in FIG. 2 comprises a core 32 made of a dielectric or other material having light transmission properties, and a thin metal film mask 34 formed on the surfaces of the core 32 by vapor deposition, etc.

The mask has at its extremity an opening 36 through which a core end 32a is exposed.

Such a probe tip opening is fabricated as follows. First, an extremity of an optical fiber core is sharpened by, e.g., selective chemical etching or by thermally drawing out.

A metal is then sublimated by heating in vacuum, and deposited as a thin film on the surface of the sharpened site, to thereby form a mask of a thin metal film for example.

The mask extremity is then removed by ion cutting using focused ion beams (FIB) for example to fabricate the opening 36.

Alternatively, a metal film may be deposited from diagonal rear while rotating the probe so that only the probe tip is free from the metal film and defines an opening in conjunction with a thinner metal film portion in the vicinity thereof. The opening 36 may be formed by this process.

The thus fabricated probe 22 is attached to a near-field head 31 of the near-field optical microscope 10 to effect the above near-field light measurement.

In order to improve the resolution of the near-field optical microscope, an opening having desired dimensions needs to be fabricated with a high reproducibility at the tip of the prove.

The above opening fabricating method by ion cutting provides a high controllability of the opening diameter but makes the processes extremely hard.

The above opening fabricating method by diagonal vapor deposition is incapable of providing fabrication with a high reproducibility, due to the locality problem of the vacuum evaporator.

For these reasons, the thus fabricated probe may not necessarily ensure successful measurement even though it is attached to the near-field optical microscope for measurement.

Thus, up until now, the development of technique has strongly been desired which enables the opening of desired dimensions to be fabricated with a high reproducibility at the probe tip, but there has been no proper technique capable of satisfying the requirements.

SUMMARY OF THE INVENTION

The present invention was conceived in view of the above problems involved in the prior art. It is therefore the object of the present invention to provide a probe opening fabricating apparatus capable of readily fabricating an opening of desired dimensions with a high reproducibility, as well as a near-field optical microscope using the same.

In order to attain the above object, according to the present invention there is provided an opening fabricating apparatus for creating an opening with desired dimensions at a mask tip of a near-field optical microscope probe, the probe including a core made of a material having a light transmission property and a mask formed on a surface of the core and made of a material having a ductility and a light shielding property; the apparatus comprising a light source, a reflection means, a light detection means, press means, storage means, calculation means and press control means.

The light source allows light to impinge on the probe.

The reflection means have an abutting surface which comes into abutment against the tip, the abutting surface reflecting incident light from the light source, directed via the core to the opening.

The light detection means detect the quantity of light of reflected light from a site where the tip abuts against the reflection means.

The press means performs pressing of the tip against the reflection means in the direction of the optical axis.

The storage means store in advance calibration information on the quantity of light of the reflected light and the dimensions of the opening.

The calculation means figure out the quantity of light of the reflected light for the acquisition of the opening with desired dimensions, from the calibration information stored in the storage means.

The press control means control pressing of the probe tip against the reflection means in the direction of the optical axis, effected by the press means, so as to allow the quantity of light of the reflected light detected by the light detection means to become equal to the quantity of light figured out by the calculation means.

As used herein, the core made of a material having a light transmission property refers to one made of a material such as quartz, semiconductor, $CaF_2$, and chalcogenide or other optical fiber material.

As used herein, the mask made of a material having a ductility and a light shielding property refers to a metal thin film, etc., for use in a mirror, such as gold, aluminum, silver, chromium and titanium, deposited on the core by vacuum evaporation or the like.

As used herein, creating an opening at a probe tip mask means that due to the ductility of the mask at the probe tip, pressing of the probe tip against the reflection means in the optical axis allow the metal to be drawn out thinly to form an opening thereat, exposing the core tip from the mask opening.

As used herein, the quantity of light of the reflected light refers to the quantity of light whose value is null when the mask has no opening since the reflection means and the probe core are shielded by the mask, and whose value increases, once the mask comes to have an opening, as a function of the dimensions of the opening since the core receives via the opening the reflected light reflected by the reflection means from the surface where the reflection means abut against the probe tip.

In the probe opening fabricating apparatus of the present invention, the press means can preferably be feed means for pressing the probe tip against the reflection means in the optical axis direction such that the mask over the probe tip is gradually drawn out thinly without being torn to pieces.

A near-field optical microscope in accordance with the present invention is provided with the probe opening fabricating apparatus, the near-field optical microscope acquiring information on a surface to be measured of a sample by: (a) an illumination-collection mode in which evanescent light is illuminated on the surface to be measured of the sample, the evanescent light emerging from an opening at a probe tip which has the opening created by the opening fabricating apparatus, the resultant scattered light or reflected light being collected through the opening; or (b) an illumination mode in which evanescent light is illuminated on the surface to be measured of the sample, the evanescent light emerging from the opening at the probe tip which has the opening created by the opening fabricating apparatus, the resultant scattered light or reflected light being collected through an external optical system; or (c) a collection mode in which a field of the evanescent light appearing on the surface to be measured of the sample is scattered by the probe tip which has the opening created by the opening fabricating apparatus, the resultant scattered light being collected through the opening.

Preferably, such a near-field optical microscope further comprises an opening diameter checking mechanism for checking the dimensions of an opening at the probe tip where the opening is formed, the opening diameter checking mechanism comprising a light source, reflection means, light detection means, press means, storage means and comparison means.

The light source allows light to impinge on the probe.

The reflection means have an abutting surface which comes into abutment against the tip, the abutting surface reflecting incident light from the light source, directed via the core to the opening.

The light detection means detect the quantity of light of reflected light from a site where the tip abuts against the reflection means.

The press means performs pressing of the tip against the reflection means in the direction of the optical axis.

The storage means store in advance calibration information on the quantity of light of the reflected light and the dimensions of the opening.

The comparison means collate the quantity of light of the reflected light detected by the light detection means with the calibration information stored in the storage means, to thereby find the dimensions of the opening at the probe tip.

Preferably, such a near-field optical microscope further comprises an opening diameter adjusting mechanism for altering the dimensions of an opening at the probe tip where the opening is formed, the opening diameter adjusting mechanism comprising a light source, reflection means, light detection means, press means, storage means, setting means, calculation means and press control means.

The light source allows light to impinge on the probe.

The reflection means have an abutting surface which comes into abutment against the tip, the abutting surface reflecting incident light from the light source, directed via the core to the opening.

The light detection means detect the quantity of light of reflected light from a site where the tip abuts against the reflection means.

The press means performs pressing of the tip against the reflection means in the direction of the optical axis.

The storage means store in advance calibration information on the quantity of light of the reflected light and the dimensions of the opening.

The setting means set desired dimensions of the opening at the probe tip.

The calculation means figure out the quantity of light of the reflected light for the acquisition of the opening having dimensions set by the setting means, from the calibration information stored in the storage means.

The press control means control pressing of the probe tip against the reflection means in the direction of the optical axis, effected by the press means, so as to allow the quantity of light of the reflected light detected by the light detection means to become equal to the quantity of light figured out by the calculation means.

In the probe opening fabricating apparatus and the near-field optical microscope using the same, the reflection means may be substituted by light emission means having an abutting surface coming into abutment against the probe tip, the light emission means being light excited by incident light from the light source, directed via the core to the opening, to thereby emit light from the abutting surface.

The excitation source for the light emission means may be voltage application means for applying DC voltage to the light emission means, in lieu of the light source, such that the light emission means emit light as a result of by voltage application by the voltage application means.

BRIEF DESCRIPTION OF THE DRAWINGS

The above and other objects, aspects, features and advantages of the present invention will become more apparent from the following detailed description when taken in conjunction with the accompanying drawings, in which.

DETAILED DESCRIPTION OF THE PREFERRED EMBODIMENT

The present invention will now be described with reference to the drawings which illustrate preferred embodiments thereof in a non-limitative fashion.

Figure 1:
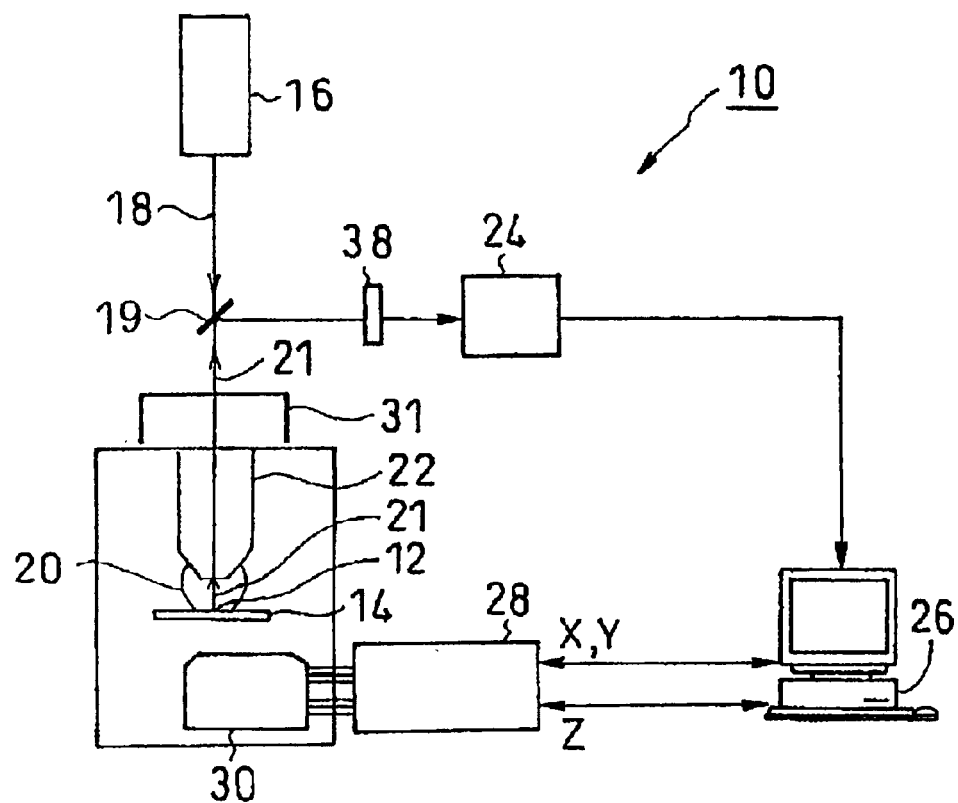
FIG. 1 is an explanatory view of a schematic configuration of a typical near-field optical microscope.
Figure 2:
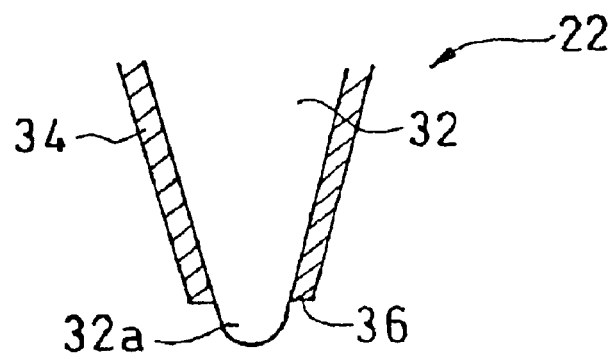
FIG. 2 is an explanatory view of a probe.
Figure 3:
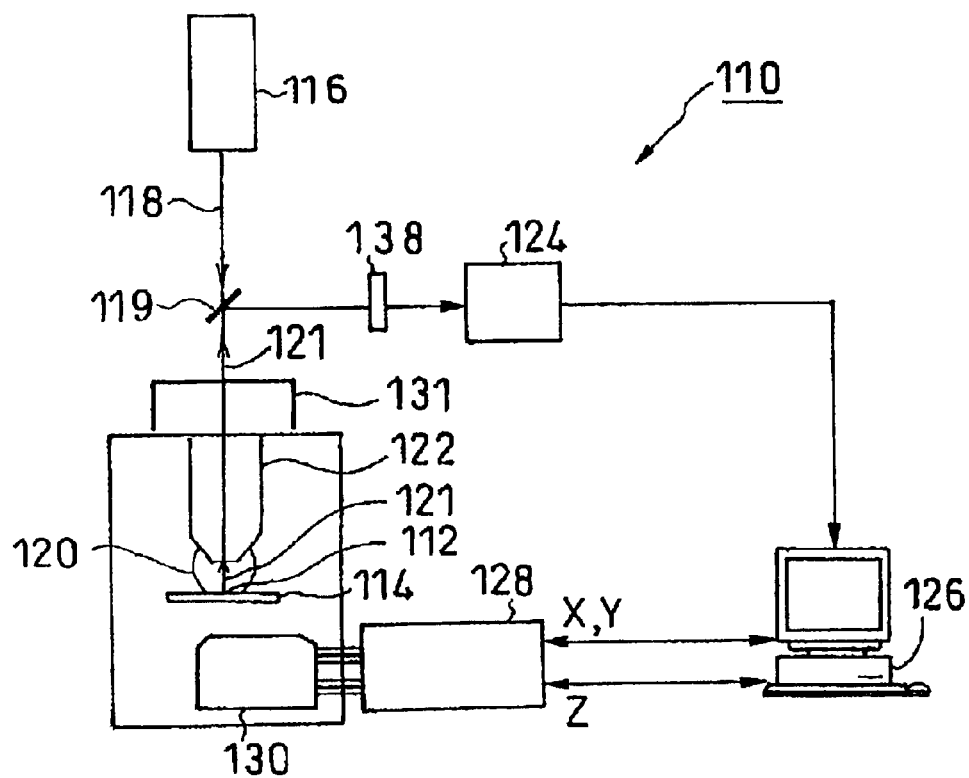
FIG. 3 is an explanatory view of a schematic configuration of a near-field optical microscope in accordance with an embodiment of the present invention.

FIG. 3 shows a schematic configuration of a near-field optical microscope in accordance with an embodiment of the present invention. Corresponding parts to those in FIG. 1 are designated by similar reference numerals obtained by adding 100 to the original numerals.

A sample 112 is placed on a substrate 114 which is disposed in the near-field optical microscope generally designated at 110 in the diagram, with incident light 118 directed from a light source 116 generating evanescent light 120 which emerges from an opening at the tip of a probe 122.

When the sample surface to be measured is approached by the tip of the probe 122 generating the evanescent light 120, the sample surface scatters the field of the evanescent light 120, allowing part of scattered light 121 thereof to enter the interior of the probe 122 through the opening. The part of the scattered light 121 is then directed via a beam splitter 119 to a spectrometer 138 for separation into light components such as Rayleigh light, Raman light and fluorescence as needed, after which they are detected by a detector 124 and data processed by a computer 126 so that the distance between the probe tip and the surface to be measured can be grasped by the Rayleigh light intensity obtained from the data processing.

More specifically, through control of an XYZ stage 130 by a stage controller 128, the vertical distance between the tip of the probe 122 and the surface to be measured of the sample 112 is adjusted such that the Rayleigh light intensity detected by the detector 124 becomes constant, while simultaneously scanning the surface to be measured of the sample 112, whereby unevenness of the sample surface can accurately be measured without contacting the sample 112.

Furthermore, the above spectroscopic spectrum enables component information at each measurement point on the surface to be measured of the sample 112 to be obtained at the same time.

The probe 122 is ordinarily attached to a near-field head 131. Because of being expendable supplies, however, it has to be detached from the head 131 for replacement.

At that time, the fabrication quality of the opening at the tip of the probe 122 may affect the resolution, etc., of the near-field optical microscope to a large extent. In case of fabricating the opening by use of the conventional method, its fabrication quality may vary, with the result that even though an already fabricated, commercially available probe is replaced with another one of the same type which in turn is attached to the near-field head for a measurement, it may be difficult to perform the measurement with satisfactory brightness and at the same accuracy as the pre-replacement.

Details of causes of this are yet partly unknown. Even though the mechanical dimensions of the probe opening are made at a higher accuracy, use in the actual measurement may allow the opening to have a different light transmission efficiency. Therefore, it may be one of the causes that the replacement of the probe results in a change of the light transmission efficiency of the opening.

The stages of individual microscopes may have a slight tilt. Therefore, intact attachment of a ready-made probe to the head may not allow the stage surface and the probe opening face to become parallel with each other, resulting in an offset therebetween. It may also be one of the causes affecting the measurement accuracy that this impedes a uniform irradiation of the evanescent light through the probe opening onto the sample surface to be measured as well as a uniform collection of light beams which have scattered the field of evanescent light, from the surface to be measured of the sample.

Thus, a first feature of the present invention is that the near-field optical microscope has a probe opening fabricating apparatus attached thereto, capable of fabricating an opening of desired dimensions at the probe tip where no opening is formed.

Figure 5:
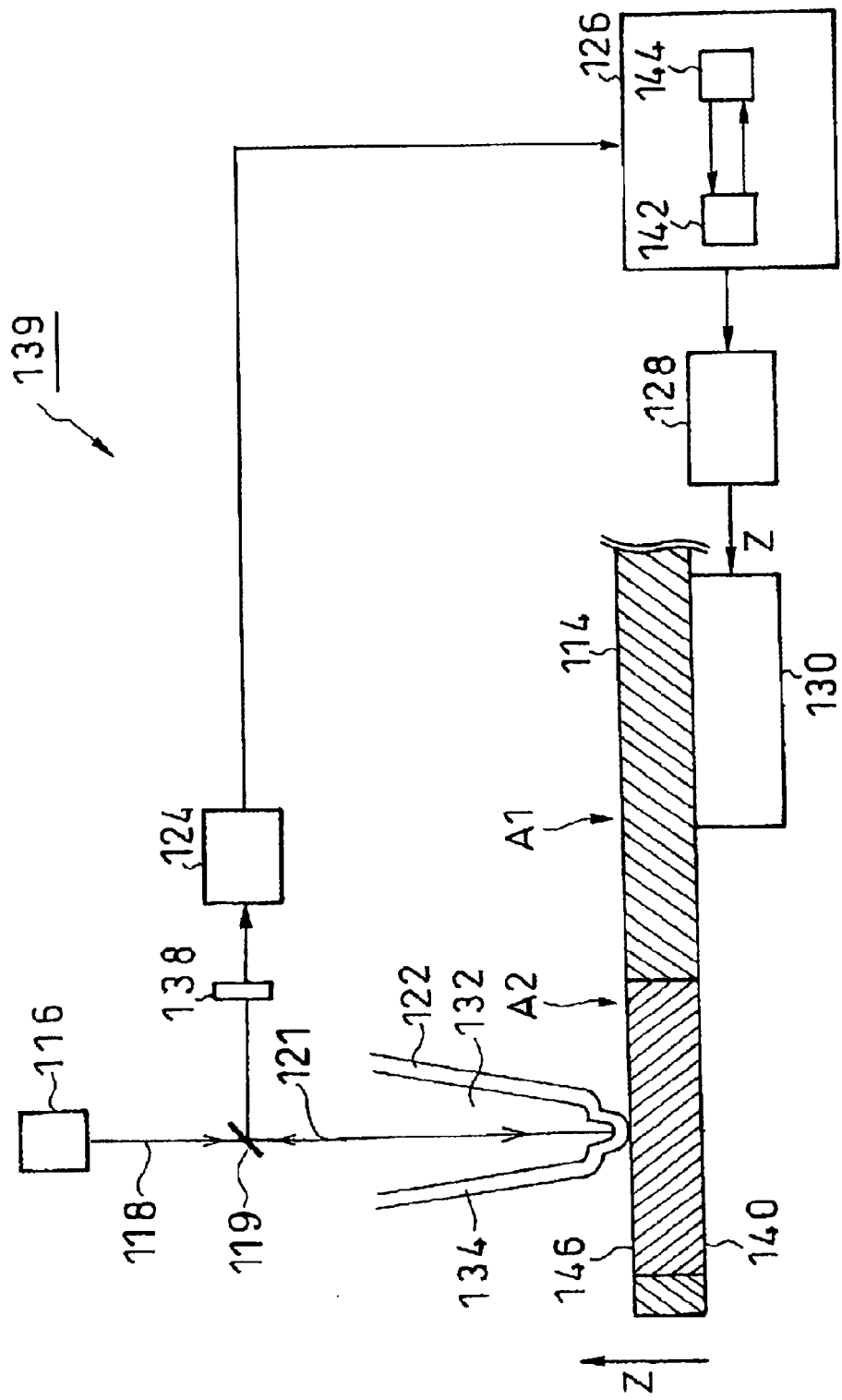
FIG. 5 is an explanatory view of a schematic configuration of the probe opening fabricating apparatus of the near-field optical microscope shown in FIG. 3.

In this embodiment, an opening fabricating apparatus is provided which is generally designated at 139, as shown in FIG. 5.

The substrate 114 of the XYZ stage 130 for use in actual near-field optical measurement is divided into an area A1 for effecting ordinary near-field optical measurement and an area A2 for, e.g., opening fabrication.

Figure 4:
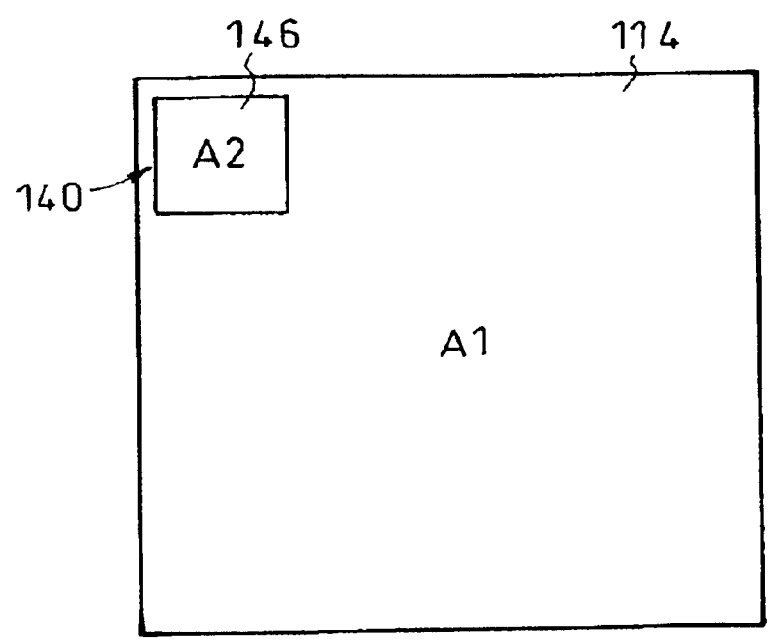
FIG. 4 is an explanatory view of a site at which is disposed a probe opening fabricating apparatus of the near-field optical microscope shown in FIG. 3.

FIG. 4 shows an exemplary arrangement of the areas A1 and A2, viewed from above the substrate 114. The arca A2 on the substrate is provided with reflection means 140 of the probe opening fabricating apparatus, whose reflection surface 146 is flush with the surface of the substrate 114.

The reflection means 140 reflect at its reflection surface 146 incident light 118 from the light source 116, directed through a core 132 to the probe opening.

The probe opening fabricating apparatus 139 of FIG. 5 comprises the light source 116, the XYZ stage (press means) 130, an HDD (storage means) 142 of the computer 126 and a CPU (calculation means/press control means) 144 of the computer 126. The probe 122 is firmly secured, at a proper site on a fiber extending in the opposite direction to the probe opening, to a near-field head of the near-field optical microscope.

The light source 116 for use in the near-field optical microscope is also used as a light source for the probe opening fabricating apparatus 139.

The light source 116 feeds incident light 118 to the probe 122.

Upon the fabrication of an opening, the XYZ stage 130 increasingly presses the reflection surface 146 of the reflection means 140 against the probe tip so that a mask 134 at the tip is gradually drawn out thinner. As continuing the pressing, the core 132 is exposed from the mask to form an opening.

The stage controller 128 is also used as press means of the opening fabricating apparatus 139 although it originally acts as a z-direction drive mechanism for the XYZ stage 130 for use in the near-field optical microscope.

The HDD 142 of the computer 126 for use in the near-field optical microscope is also used as the storage means of the opening fabricating apparatus. Accordingly as the opening become larger as the result of pressing, the quantity of light of reflected light detected increases. Thus, there is a one-to-one correlation between the dimensions of the opening and the quantity of light of the reflected light. Therefore, by storing such a correlation as calibration information in advance, the opening of desired dimensions can be obtained through monitoring of the quantity of light of the reflected light.

This HDD 142 stores in advance calibration information on the correlation between the quantity of light of the reflected light from the tip of the probe 122 and the dimensions of the opening.

The CPU 144 of the computer 126 for use in the near-field optical microscope is also used as calculation means of the opening fabricating apparatus.

This CPU 144 figures out a quantity-of-light value for obtaining the opening of desired dimensions, from the calibration information stored in the HDD 144.

The CPU 144 of the computer 126 for use in the near-field optical microscope is also used as press control means of the opening fabricating apparatus.

Figure 6:
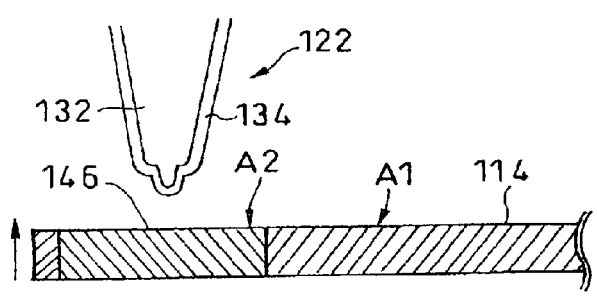
FIGS. 6A to 6C are explanatory views of operations of the probe opening fabricating apparatus shown in FIG. 5.
Figure 6:
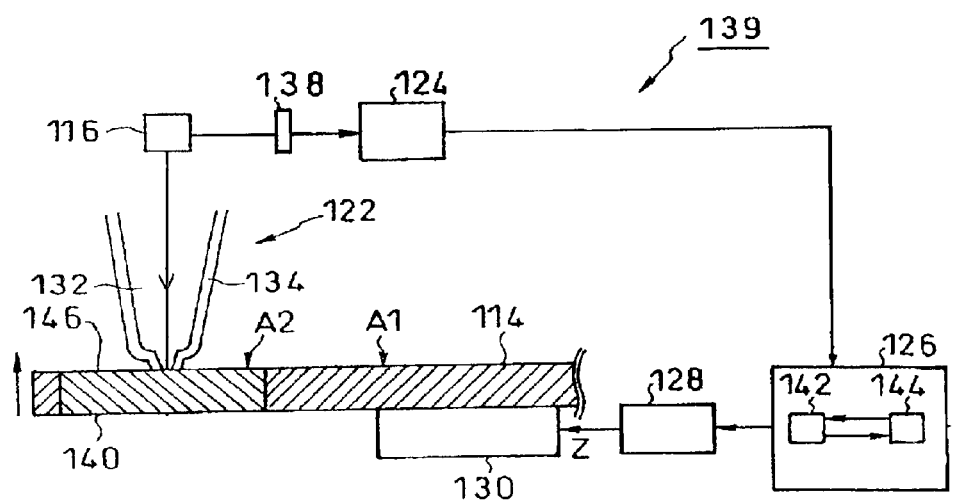
Figure 6:
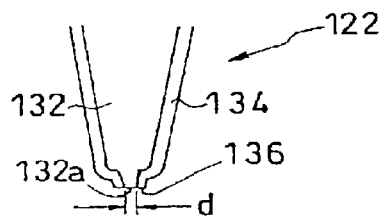

This CPU 144 controls the pressing, in the optical axis direction, of the reflection means against the probe tip by the XYZ stage 130 such that the quantity-of-light value detected by a detector (photo detection means) 124 becomes equal to the quantity-of-light value figured out by the CPU 144. More specifically, the reflection surface 146 of the reflection means 140 is abutted against the tip of the probe 122 where no opening is formed as shown in FIG. 6A.

Then, as shown in FIG. 6B, the detector (CCD camera, etc.) 124 detects the quantity of light of the reflected light from the probe tip, originating from the incident light 118, and while monitoring the thus detected quantity-of-light value by the computer 126, the substrate 114 is displaced upward by the XYZ stage 130 so as to press the reflection surface 146 of the reflection means 140 against the tip of the probe 122 little by little upward in the diagram.

As increasingly pressed, the mask 134 on the probe tip is drawn out thinner and thinner due to its ductility so as to form an opening by degrees, with the result that an extremity 132a of the core 132 is exposed from the opening as shown in FIG. 6C.

Once the extremity 132a of the core 132 gets exposed, the quantity-of-light value detected by the detector 124, which has been null so far, will increase accordingly as the opening diameter becomes larger. The computer 126 allows a z-direction displacement mechanism for the XYZ stage 130 to progressively press the reflection means against the tip of the probe 122 until the quantity-of-light value reaches a value presenting a desired opening diameter.

Thus, as shown in FIG. 6C, an opening 136 having a desired opening diameter d is fabricated in the mask 134 over the tip of the probe 122.

Since the opening can be fabricated while simultaneously monitoring the quantity of light of the emitted light, any opening with intended dimensions can be fabricated with a high reproducibility even when the probe has been replaced with another one. For example, it would readily be possible to fabricate a round opening or to reduce the protrusion of the core. By virtue of the control based on the quantity of light reflected in the region of the opening, variability in the light transmission efficiency will remarkably be improved among the probes fabricated, as compared with the conventional geometry-based control.

For the fabrication of the opening, the actually used sample stage surface is made flush with the reflection surface of the reflection means 140, whereby it is possible to form the opening face parallel to the stage surface even when the stage surface has a tilt. In addition, accurate measurement can be ensured since the measurement is made with the probe having the thus fabricated opening, attached to the near-field head.

Moreover, due to the implementation of the function of each constituent member of the opening fabricating apparatus by use of each constituent member of the near-field optical microscope, there can be achieved a simplification of configuration and a reduction in size of the apparatus, as compared with the case where the constituent members have separately been provided.

The probe, which has thus been fabricated in the state attached to the near-field head of the near-field optical microscope, can continue to be used in the ordinary near-field optical measurement area A1 till the replacement thereof.

Opening Diameter Checking Mechanism

In the course of use of the thus fabricated opening, the opening diameter may possibly suffer a variance.

Up until now, however, there has been no means to check the variance in a simplified manner. Furthermore, check has to be made after detaching the probe from the microscope. After reattachment of the probe posterior to the checking, there again arises a need for an optical axis alignment with the optical system for controlling the probe oscillation amplitude, etc., requiring extremely troublesome works.

A second feature of the present invention is that the near-field optical microscope is provided with an opening diameter checking mechanism capable of checking the dimensions of the probe tip opening which has been fabricated by the probe opening fabricating apparatus, the checking being made with the probe being attached to the near-field head.

Figure 7:
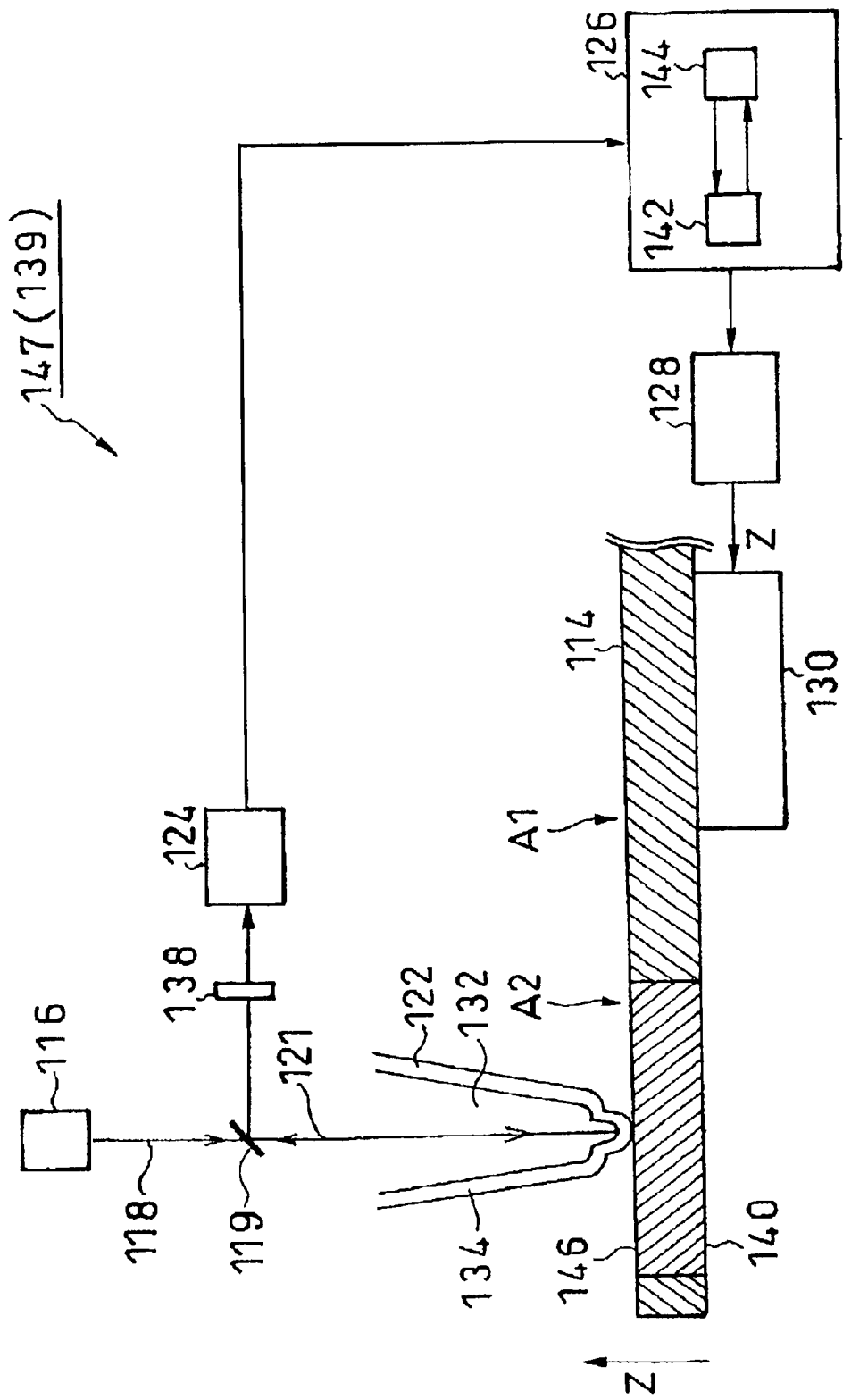
FIG. 7 is an explanatory view of a schematic configuration of an opening diameter checking mechanism of the near-field optical microscope shown in FIG. 3.

To this end, this embodiment includes an opening diameter checking mechanism generally designated at 147, as shown in FIG. 7.

In the diagram, the opening diameter checking mechanism 147 comprises the light source 116, the HDD (storage means) 142, the reflection means 140 and the CPU (comparison means) 144.

The XYZ stage 130 causes the reflection surface 146 of the reflection means 140 to abut against the probe tip.

The CPU (comparison means) 144 collates the quantity-of-light value of reflected light from the reflection surface 146, originating from the incident light 118 from the light source 116, detected by the detector (photo detection means) 124, with the calibration information stored in the HDD (storage means) 142, to thereby figure out the dimensions of the opening at the probe tip.

Figure 8:
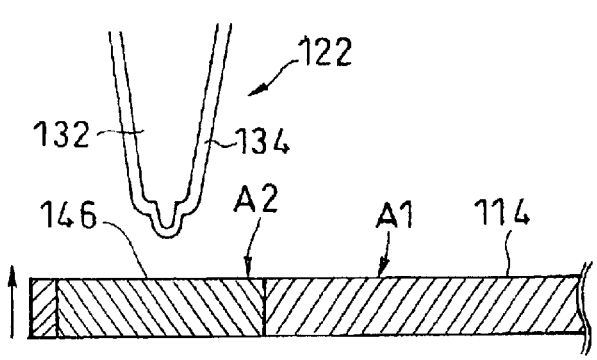
FIGS. 8A and 8B are explanatory views of operations of the opening diameter checking mechanism shown in FIG. 7.
Figure 8:
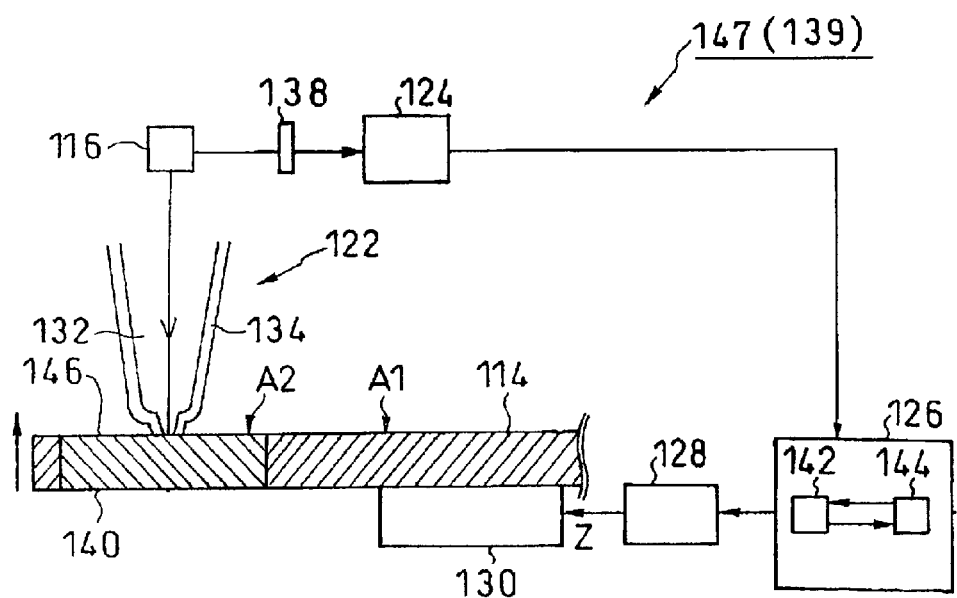

As a result, upon the ordinary near-field optical measurement the probe 122 is located on the area A1 of the XYZ stage 140, but when making a check of the opening diameter the probe 122, which has an opening fabricated by the opening fabricating apparatus, is moved to the area A2 of the XYZ stage as shown in FIG. 8A.

A check can thus easily be made of whether an opening of predetermined diameters is formed or not by merely causing the reflection surface 146 of the reflection means 140 to abut against the probe tip by the XYZ stage 130 with the probe 122 being attached thereto as shown in FIG. 8B.

More specifically, due to one-to-one correlation between the dimensions of the opening and the quantity-of-light value of the reflected light from the site where the opening abuts against the reflection surface 146 upon the incident light irradiation, the dimensions of the opening at the probe tip can be found out by detecting by the detector 124 the quantity-of-light of reflected light from the probe tip abutting against the reflection surface 146 of the reflection means 140 and applying by the CPU 144 the detected quantity-of-light value to the calibration information stored in the HDD 142.

Furthermore, due to the implementation of the function of each constituent member of the opening diameter checking mechanism by use of each constituent member of the near-field optical microscope (and also opening fabricating apparatus), a simplified configuration and a miniaturized apparatus can be achieved as compared with the case where the constituent members are separately provided.

If the opening diameter has no problem in term of measurement after the checking, then the probe is returned to the area A1 of the XYZ stage allowing the execution of the ordinary near-field optical measurement.

Opening Diameter Adjusting Mechanism

However, the thus fabricated opening may possibly suffer a variance of the opening diameter in the course of use, or even if no variance occur, the opening diameter may be desired to change after the fabrication.

However, the probe has to be replaced upon the change in the prior art, with the result that after attachment of a new probe there arises a need for an optical axis alignment with the optical system which provides a control of the probe oscillation amplitude, etc., requiring extremely troublesome works.

Thus, a third feature of the present invention is that the near-field optical microscope is provided with an opening diameter adjusting mechanism capable of changing the opening dimensions of a probe having an opening formed by the probe opening fabricating apparatus such that the change of the opening dimensions can be made with the probe being attached to the near-field head.

Figure 9:
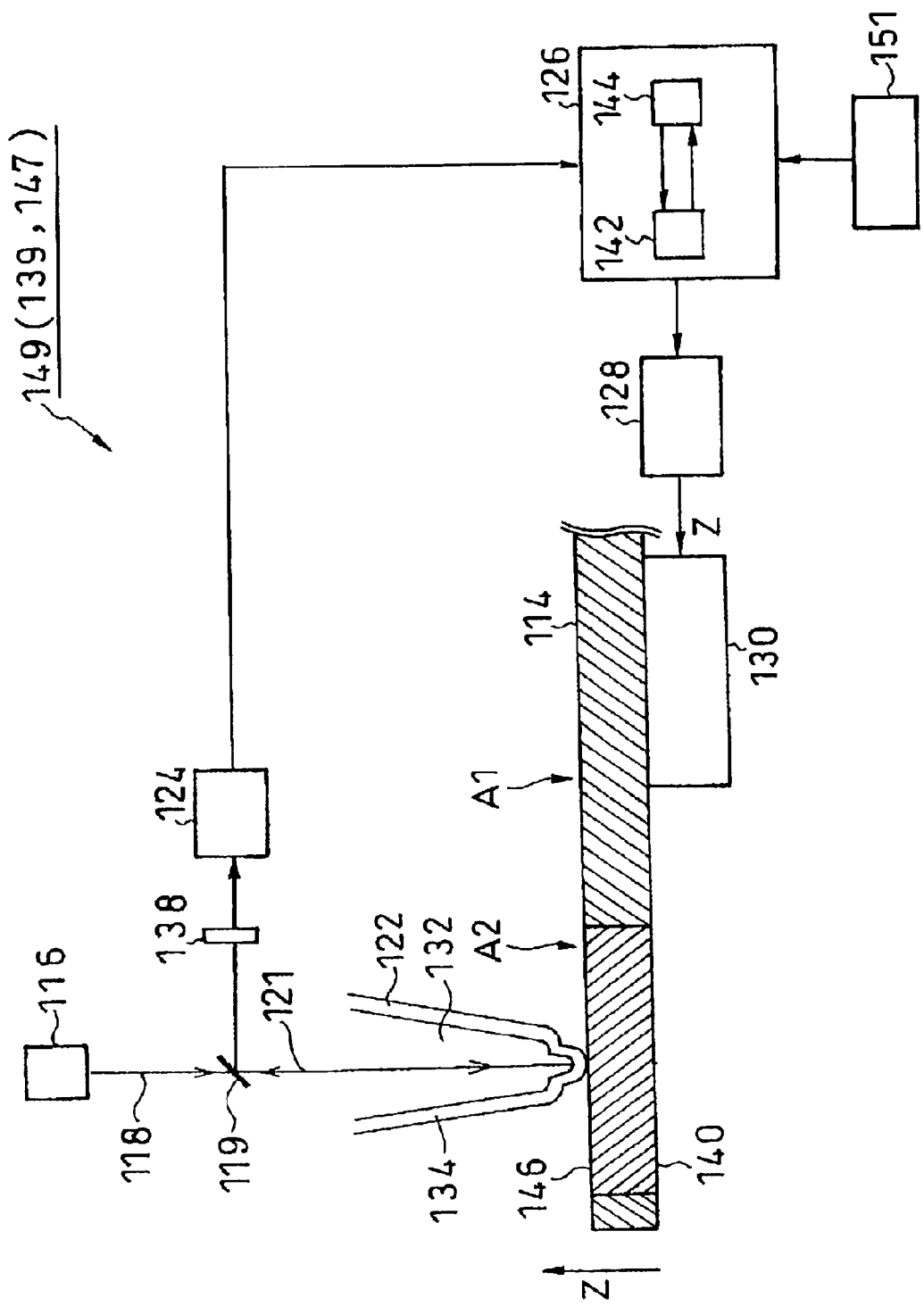
FIG. 9 is an explanatory view of an opening diameter adjusting mechanism of the near-field optical microscope shown in FIG. 3.

To this end, this embodiment includes the opening diameter adjusting mechanism generally designated at 149, as shown in FIG. 9 in an enlarged manner.

This opening diameter adjusting mechanism 149 comprises the light source 116, the reflection means 140, the XYZ stage (press means) 130, the HDD (storage means) 142, the CPU (calculation means/press control means) 144 and entry device (setting means) 151.

The entry device 151 allows desired dimensions of the opening at the probe tip to be set into the computer 126.

The CPU (calculation means) 144 applies the opening diameter set through the entry device 151 to the calibration information stored in the HDD 142, to find a quantity-of-light value of reflected light from the site where the probe tip abuts against the reflection surface 146, for obtaining the desired opening diameter.

The CPU (press control means) 144 controls the pressing of the reflection surface 146 of the reflection means 140 against the probe tip by the z-direction displacement (upward movement) of the XYZ stage 130 such that the quantity-of-light value of reflected light from the reflection surface 146, originating from the incident light from the light source 116, detected by the detector (photo detection means) 124 becomes equal to the quantity-of-light value figured out by the CPU 144.

The stage controller 128, acting as a z-direction drive mechanism for the XYZ stage 130, for use in the near-field optical microscope is also used as press means of the opening diameter adjusting mechanism 149.

Figure 10:
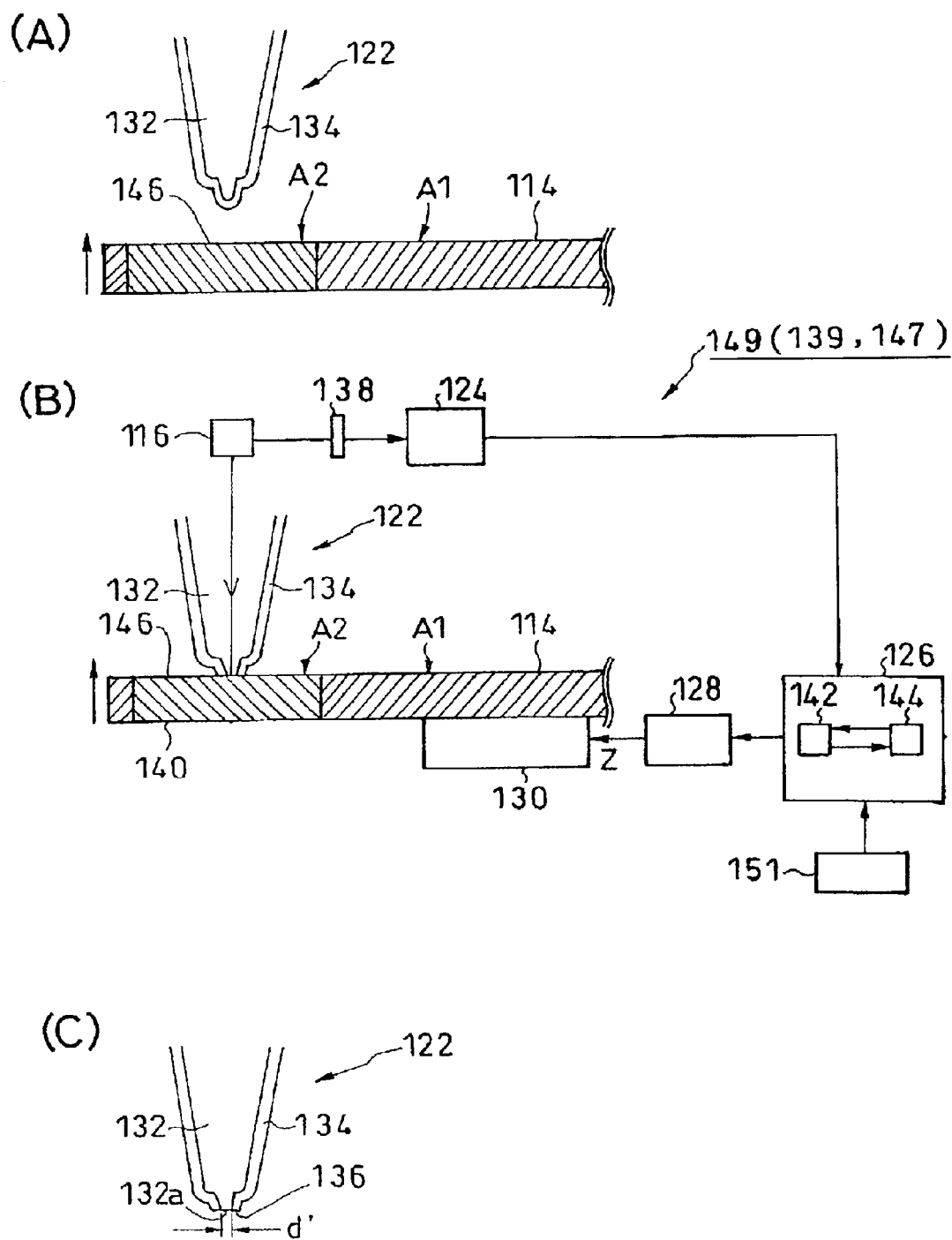
FIGS. 10A to 10C are explanatory views of operations of the opening diameter adjusting mechanism shown in FIG. 9.

As a result of this, upon the ordinary near-field optical measurement the probe lies on the area A1 of the XYZ stage, whereas upon the check or change of the opening diameter the probe 122 having an opening formed by the opening fabricating apparatus is moved to the area A2 of the substrate 114 of the XYZ stage 130 as shown in FIG. 10A.

The reflection surface of the reflection means 140 is then abutted against the probe tip as shown in FIG. 10B and desired opening dimensions are entered through the entry device 151.

The CPU 144 then finds a quantity-of-light value for obtaining the opening dimensions entered via the entry device 151, through application to the calibration information stored in the HDD 142.

With the reflection surface 146 of the reflection means 140 abutted against the probe tip, while detecting the quantity of light of reflected light from that tip by the detector 124 the CPU 144 provides a control of pressing of the reflection surface of the reflection means against the probe tip through a z-direction displacement of the XYZ stage 130 so that the detected quantity-of-light value becomes equal to the quantity-of-light value figured out by the CPU 144, thereby enabling the probe opening 136 to easily be changed so as to have an opening diameter d' as shown in FIG. 10C.

After changing of the opening diameter, the probe is returned to the area A1 of the XYZ stage, allowing execution of the ordinary near-field optical measurement.

Thus, this embodiment enables the opening diameter to easily be changed so as to have desired dimensions by merely pressing the reflection surface of the reflection means against the probe tip with the probe attached.

Furthermore, the function of each constituent member of the opening diameter adjusting mechanism is implemented by use of each constituent member of the near-field optical microscope (and also opening fabricating apparatus, opening diameter checking mechanism), with the result that a simplified configuration and a reduced apparatus size can be achieved as compared with the case where those constituent members are separately provided.

As described above, the near-field optical microscope 110 in accordance with this embodiment is able to fabricate any opening of intended dimensions with a high reproducibility, due to the provision of the opening fabricating apparatus 139 which fabricates an opening while actually monitoring the quantity of light of the opening transmitted light.

In addition, the actually used sample stage is provided so as to be flush with the reflection surface of the reflection means 140 for fabrication of an opening, whereby it is possible to form the opening face parallel to the stage surface.

The thus fabricated probe continues to unchangingly be used in the near-field optical measurement till the replacement thereof, so that the near-field optical measurement in the area A1 can accurately be carried out.

By virtue of provision of the opening diameter checking mechanism 147, this embodiment enables checking of an opening of the probe having the opening formed therein to readily be made, by merely moving the probe to the area A2 flush with the area A1 of the stage, without detaching the probe from the microscope.

By virtue of provision of the opening diameter adjusting mechanism 149, this embodiment enables a change of the opening dimensions to be carried out with ease and to desired dimensions by merely moving the probe to the area A2 flush with the area A1 of the stage, without detaching the probe from the microscope.

The near-field optical microscope of the present invention is not limited to the above configurations but could variously be modified without departing from the spirit of the invention.

Although the above configuration has been described with respect to the example where the probe opening fabricating apparatus is incorporated in the near-field optical microscope, the probe opening fabricating apparatus could be used solely.

The above configuration has been described with respect to the example where the probe is positionally fixed in z direction, with the reflection means being displaced (upwardly moved) in z direction so that the reflection means are pressed against the probe tip, but instead the reflection means may positionally be fixed in z direction, with the probe being displaced (downwardly moved) in z direction by a z-direction minute feed mechanism, etc., so that the probe tip is pressed against the optical detection means.

In the probe opening fabricating apparatus and the near-field optical microscope using the same, which have been set forth hereinabove, the reflection means could be substituted by light emission means having a surface abutting against the probe tip, the abutting surface emitting light as a result of optical excitation by incident light from the light source, directed through the core to the opening. Thus, the embodiments described with reference to FIGS. 3 to FIGS. 10A to 10C could be an opening fabricating apparatus using light emission means in place of the reflection means 140, or a near-field optical microscope using the apparatus, the opening diameter checking mechanism and the opening diameter adjusting mechanism.

The light emission means contains a light-emitting substance which emits fluorescence, etc., in the vicinity of the surface abutting against the probe tip. The abutting surface emits light as a result of the optical excitation by the incident light 118 from the light source 116, directed through the core to the probe tip opening.

Then, detection is made of the quantity of light emitted from the light emission means, to thereby effect the opening fabrication and the checking, etc., in the same manner as the above.

An exciting source for the light emission means included in the probe opening fabricating apparatus, opening checking mechanism and opening adjusting mechanism could be, in lieu of the light source, voltage applying means which apply DC voltage to the light emission means so as to allow the light emission means to emit light through the application of voltage.

Figure 11:
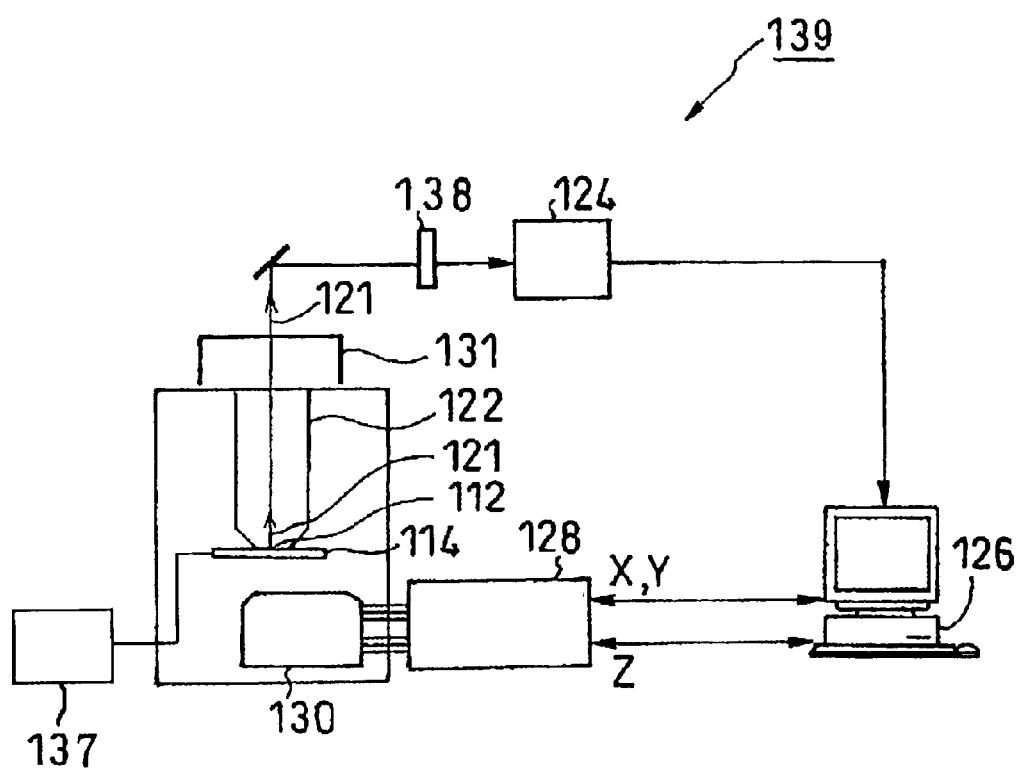
FIG. 11 is an explanatory view showing an embodiment of the probe opening fabricating apparatus of the near-field optical microscope shown in FIG. 3.

FIG. 11 shows a form where the probe opening fabricating apparatus employs the voltage applying means. In this form, the light emission means included in the substrate 114 emit light such as fluorescence by the action of DC voltage applied from the voltage applying means 137 to the light emission means. Light-emitting materials for such light emission means can specifically be an organic electroluminescent element, an inorganic light-emitting diode, etc.

Figure 12:
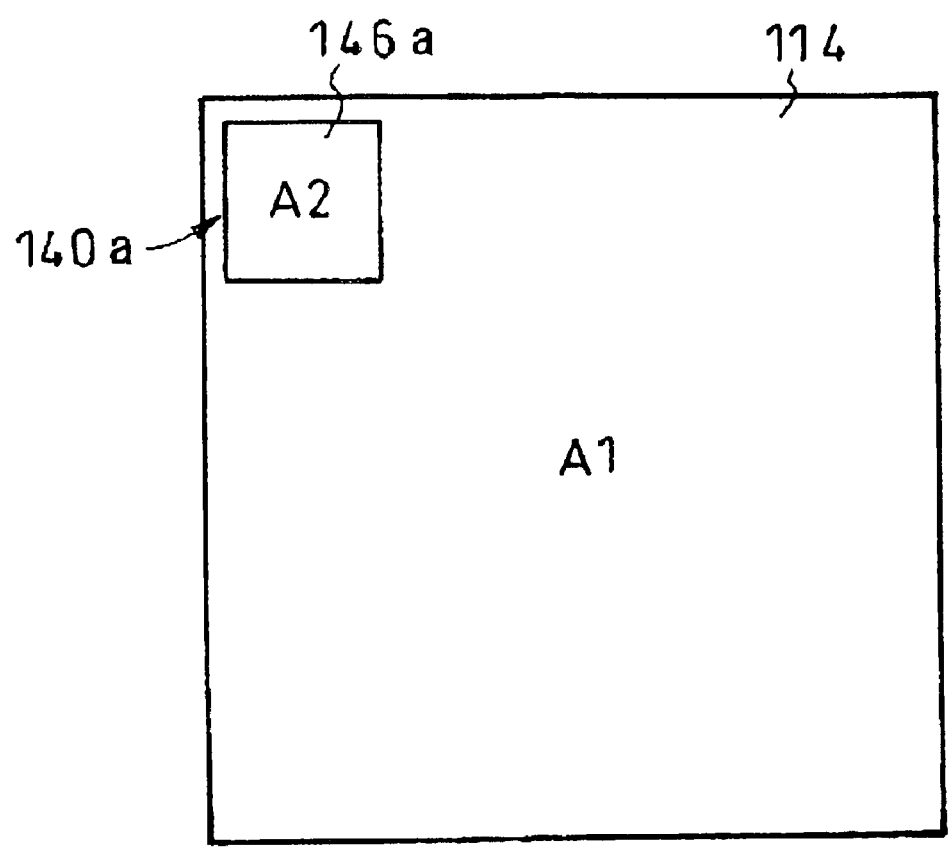
FIG. 12 is an explanatory view of a site at which is disposed the probe opening fabricating apparatus of the near-field optical microscope shown in FIG. 11.
Figure 13:
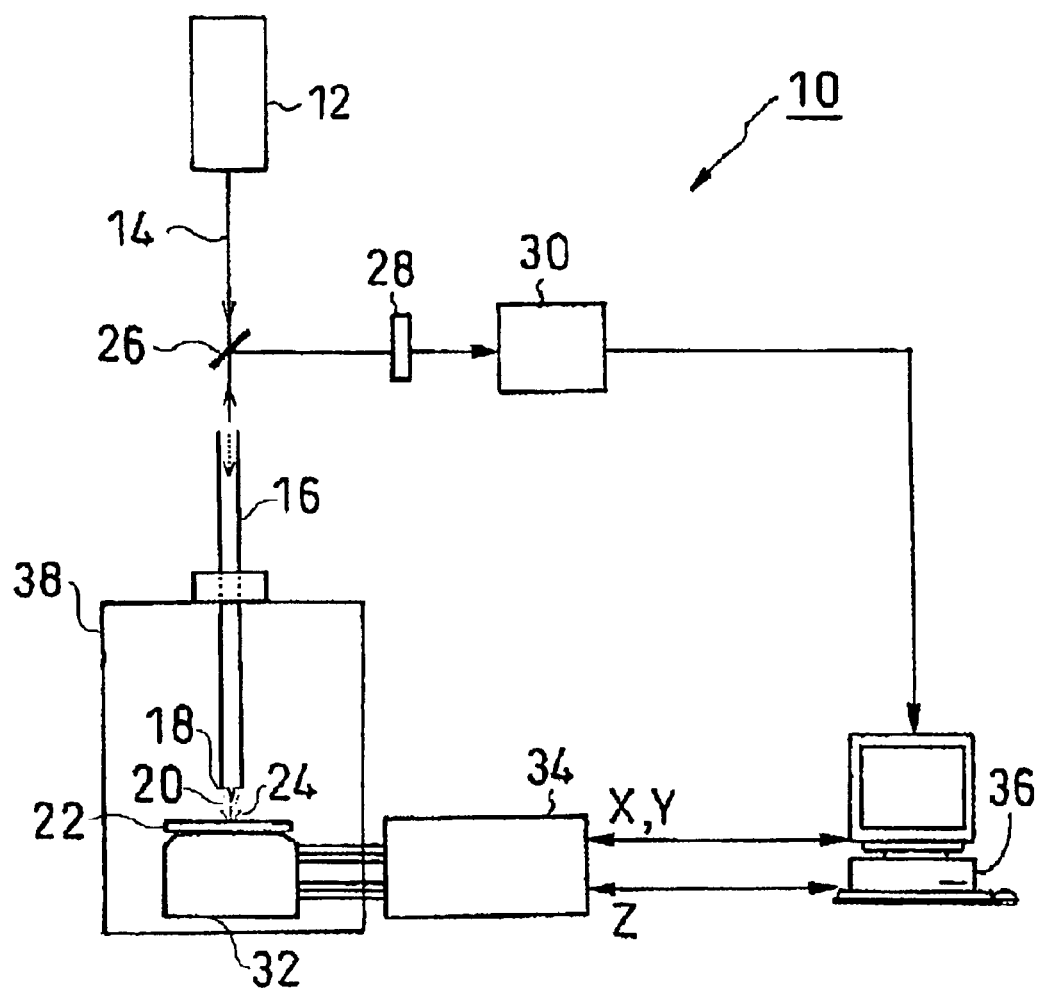
FIG. 13 is a schematic explanatory view of the near-field optical microscope.

FIG. 12 shows, in top plan, an exemplary arrangement of the substrate 114. The substrate 114 of the XYZ stage 130 is divided into an area A1 for effecting ordinary near-field optical measurement and an area A2 for opening fabrication.

The area A2 on the substrate is provided with light emission means 140a of the probe opening fabricating apparatus, whose light-emitting surface 146a is flush with the surface of the substrate 114.

Light from the light emission means 140a is directed via the opening in abutment against the light-emitting surface 146a to the probe core so that the quantity of light emitted is detected by a detector.

The same configuration as the above can be employed except that the light source is not particularly required. Configurations would also be feasible of the near-field optical microscope provided with the voltage applying means or the near-field optical microscope provided further with the opening diameter checking mechanism and opening diameter adjusting mechanism, of such a voltage-applied type.

Background Reduction Method

A method will hereinafter be described which is preferably applicable for the reduction of background in the measurement effected by the above near-field optical microscope.

A typical material for the near-field optical microscope probe can be a commercially available universal glass fiber.

The commercially available glass fiber is supplied in the form of one with a protective coating of UV-cured resin, nylon, etc., for example, in order to reinforce the strength of the fiber against bending. More specifically, as shown in a fiber axial sectional view of FIG. 14, a glass fiber 60 includes a protective coating 86 adjacent externally to a cladding layer 64.

Figure 15:
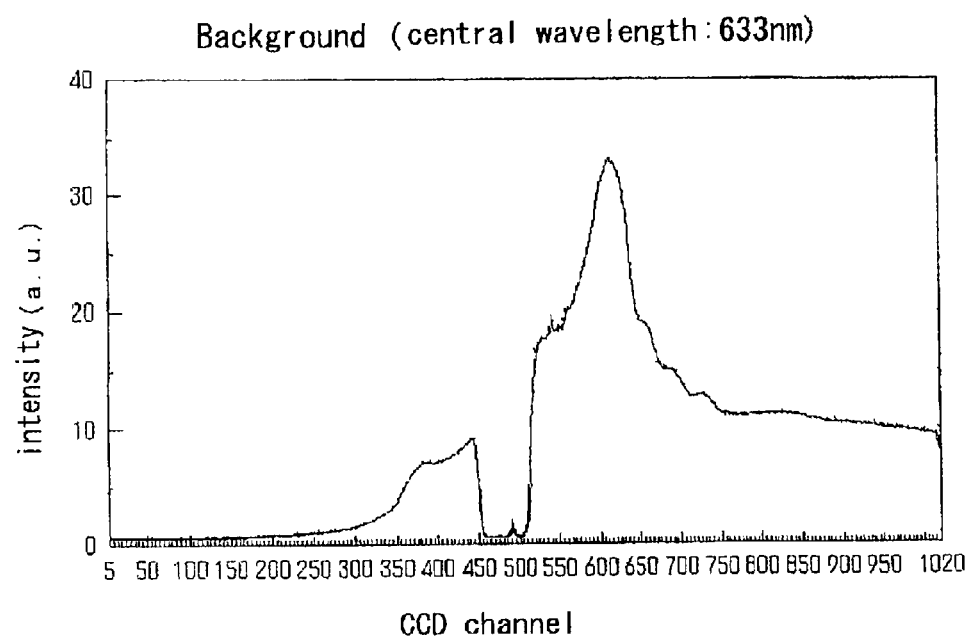
FIG. 15 is a graphical representation of the background measured by illumination-collection mode using a conventional probe.

One problem of the near-field optical microscope was to improve the background. For example, as shown in FIG. 15 there may be found a large background which depends on the measured wavelength, as appearing upon the background measurement in the illumination-collection mode. The large background has to be subtracted from the spectrum measured with a sample being disposed, to thereby obtain a true spectrum, which was an obstacle to acquisition of a satisfactory accuracy.

A primary factor of this background may be a contribution of the cladding light components, which are introduced via the cladding layer into the detector. More specifically, light emission such as fluorescence generated in the protective coating or the cladding layer by the incident light leaking from the core layer, or external light mixed into the cladding layer may reach the detector while remaining in the cladding layer, which may be detected as the background components. Due to inability to separate, prior to introduction into the detector, light components coming through the cladding layer and light components coming through the core layer, the background components are fed together with signal components into the detector, for detection.

Especially, in the event that the sample is excited by ultraviolet rays as the incident light to detect fluorescence within a visible region, the protective coating layer and cladding layer can also emit fluorescence within the visible region due to ultraviolet rays leaking from the core layer, which may contribute to the background to a large extent.

Figure 14:
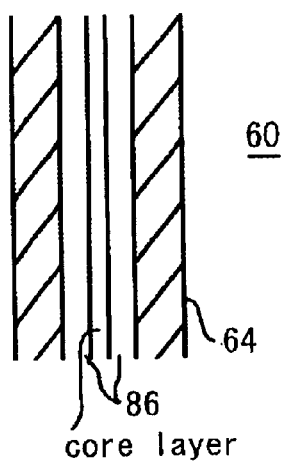
FIG. 14 is an axial sectional view of a commercially available glass fiber.

In case of using the glass fiber as the near-field optical microscope probe, the coating need not necessarily be provided for imparting the strength to the fiber, unlike the commercially available fiber of FIG. 14. Hence, the fiber may be immersed in an organic solvent to remove a protective coating layer 66 of the UV-cured resin, nylon, etc., thereby making it possible to reduce the background attributable to light emission from the protective coating layer 66, which may be caused by, e.g., the incident light leaking from the core layer.

However, this method is unable to reduce the background based on light emission arising from the cladding layer or on stray light mixed into the cladding layer.

Figure 16:
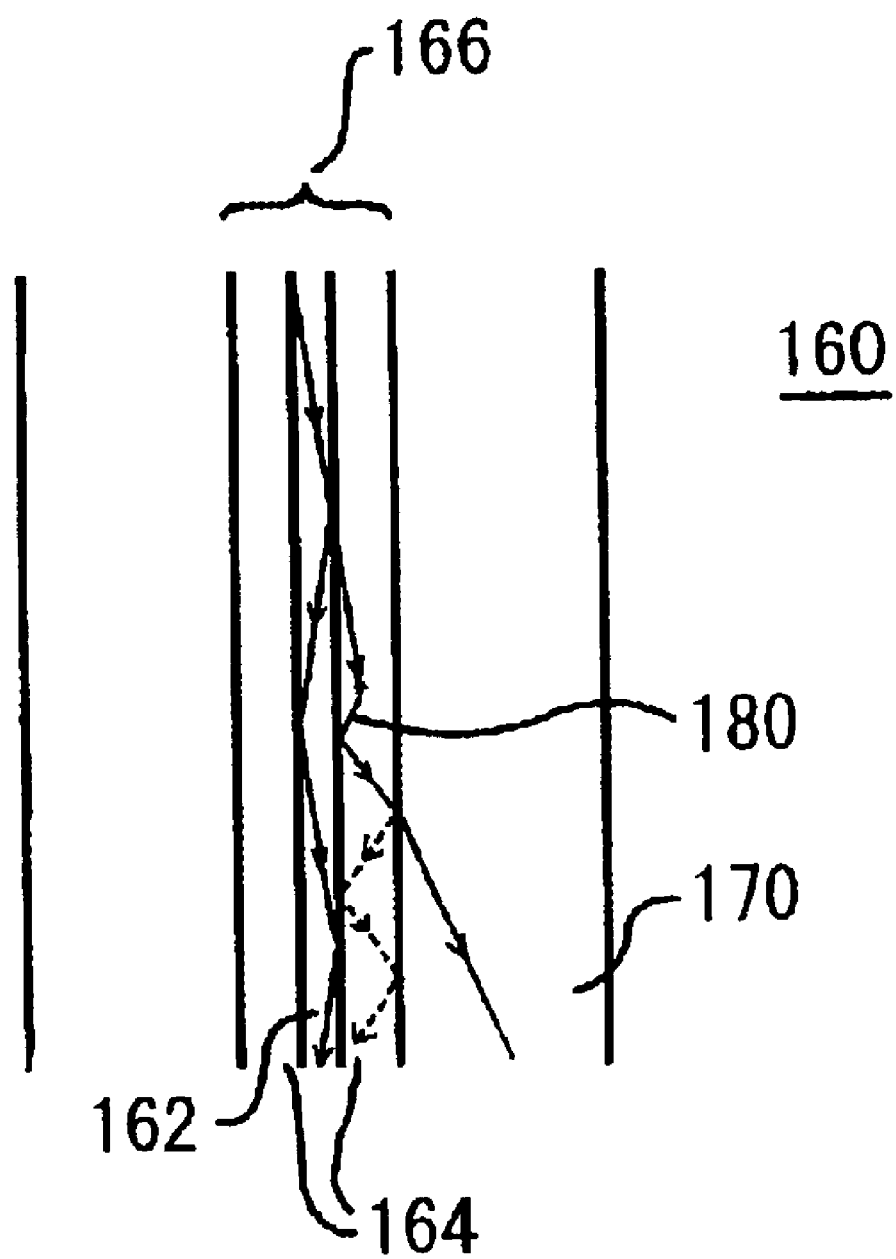
FIG. 16 is a schematic explanatory view of a probe with a scattering layer.

The present inventor found that this problem could be solved by using a probe schematically shown in FIG. 16 which is an axial sectional view of the probe. The probe generally designated at 160 in the diagram comprises a glass fiber 166 consisting of a core layer 162 and a cladding layer 164, and a scattering layer 170 adjacent externally to the cladding layer 164.

The scattering layer 170 has substantially the same refractive index as the cladding layer 164.

Provision of such a scattering layer 170 remarkably reduces the background as compared with the prior art. This effect is considered to come from the reason which follows. The refractive index $n_1$ of the cladding layer 164 being substantially equal to the refractive index $n_2$ of the scattering layer, background components 180 based on the light emission generated in the cladding layer by the incident light leaking from the core or on the external light mixed into the cladding layer tend to easily be refracted at the interface between the cladding layer 164 and the scattering layer 170 without being reflected thereat, toward the scattering layer 170.

On the contrary, in the event of using the commercially available fiber as in the prior art, the refractive index (approx. 1.4) of the protective coating layer is smaller than the refractive index (approx. 1.5) of the fiber cladding layer, so that reflection is apt to occur at the interface between the cladding layer and the protective coating layer. It is thus envisaged that the background components undergo repetitive reflections at the interface between the cladding layer and the protective coating layer and at the interface between the cladding layer and the core layer and transmit while remaining in the cladding layer, to reach the detector.

If the ratio of the refractive index $n_1$ of the cladding layer 144 to the refractive index $n_2$ of the scattering layer 170 is about 0.9 to 1.1, more preferably about 0.95 to 1.05, then a more remarkable background reduction effect can be obtained as compared with the prior art. In particular, it would be preferable in terms of the angle of refraction of cladding light for example that the refractive index $n_2$ of the scattering layer be larger than the refractive index $n_1$ of the cladding layer.

The scattering layer 170 may be formed by adhering a solid with a plasticity or a liquid with a high viscosity, exemplified by resin (preferably containing no light emitting components) such as adhesive for optics, plastic, glass, water-glass, glycerin, quartz, silicon, ZnSe, diamond, etc., to the surface of the cladding layer. In case of a solid, as long as it presents a plasticity at a high temperature even though it has no plasticity at a normal temperature, the scattering layer can be formed by heating to increase its fluidity, adhering to the cladding layer surface and then cooling.

Alternatively, a liquid may be used as the scattering layer. In this case, the glass fiber is immersed in the liquid so as to adjoin to the cladding layer surface.

It is most preferred, but not particularly limited thereto, that the glass fiber be coated along its circumference in section with the scattering layer without any gaps.

It would also be possible to lower the refractive index of the cladding layer by adjusting the composition of the cladding layer through quantitative control of ingredients other than quartz, to consequently achieve coordination with the refractive index of the scattering layer.

Exemplary forms will then be described when the above probe is used in the measurement modes of the near-field optical microscope.

Figure 17:
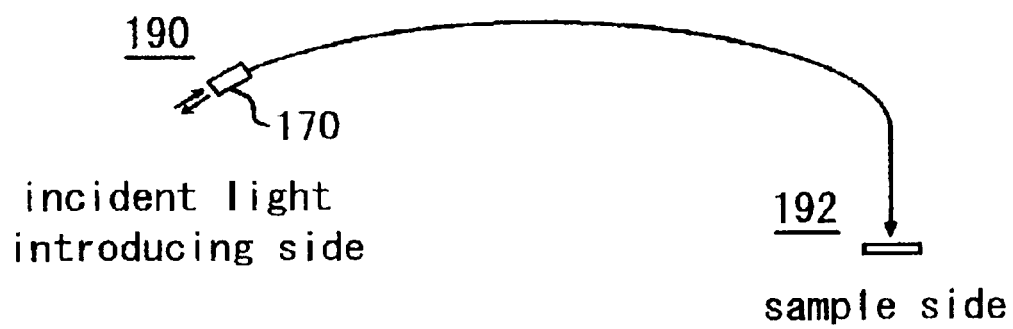
FIGS. 17A and 17B are schematic explanatory views in accordance with an embodiment of the probe of the present invention.
Figure 17:
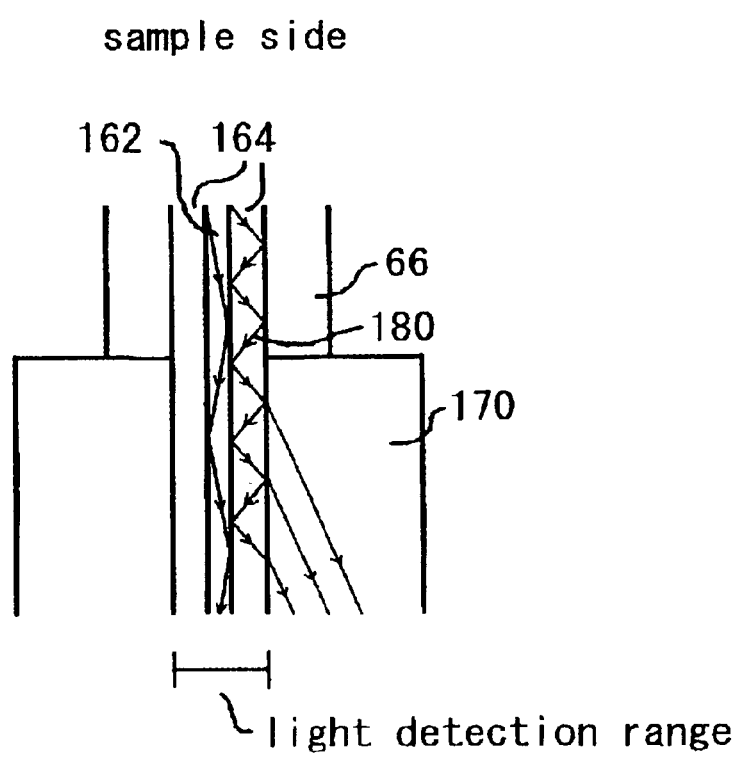

FIGS. 17A and 17B are schematic views of the case where this probe is used in the illumination-collection mode or the collection mode. As shown in FIG. 17A, a scattering layer 170 is formed on a glass fiber end 190 from which the incident light is introduced.

In this case, as shown in FIG. 17B, a cladding light 180 causing the background, accumulated from the sample-side end of the glass fiber, will move toward the scattering layer 170 formed at the end 190, with the result that a reduced cladding light is directed to the detector so that a remarkably lowered background is detected.

In this manner, the background reduction can be achieved through a relatively simple work removing the protective coating layer of the commercially available glass fiber at its end only and thereafter forming the scattering layer thereat.

Figure 18:
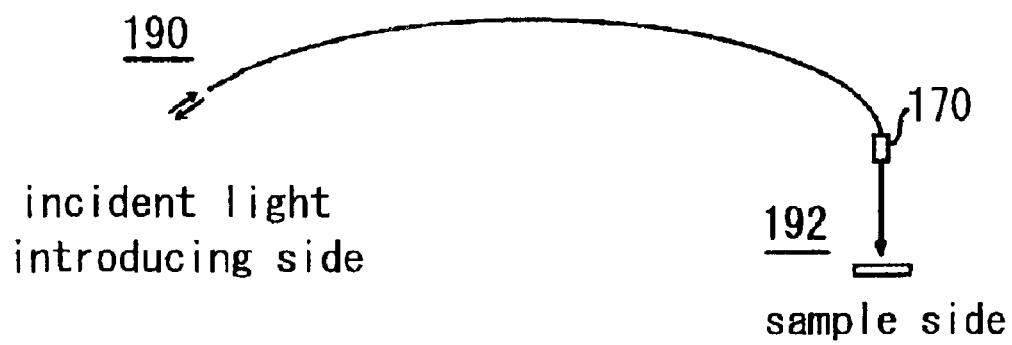
FIGS. 18A and 18B are schematic explanatory views in accordance with another embodiment of the probe with a scattering layer.
Figure 18:
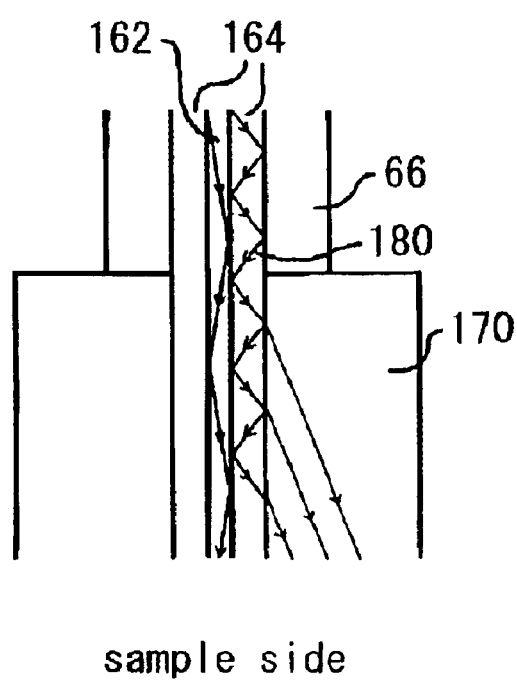

FIGS. 18A and 18B are schematic views of the case where this probe is used in the illumination mode. As shown in FIG. 18A, the scattering layer 170 is formed on a glass fiber end 192.

In this case, as shown in FIG. 18B, the cladding light 180 causing the background, accumulated from the glass fiber end 190 from which the incident light is introduced, will move toward the scattering layer 170 formed at the end 192, with the result that a reduced cladding light is irradiated from the probe tip so that a remarkably lowered background is detected.

Otherwise, the scattering layer may be formed over the full length of the glass fiber.

Figure 19:
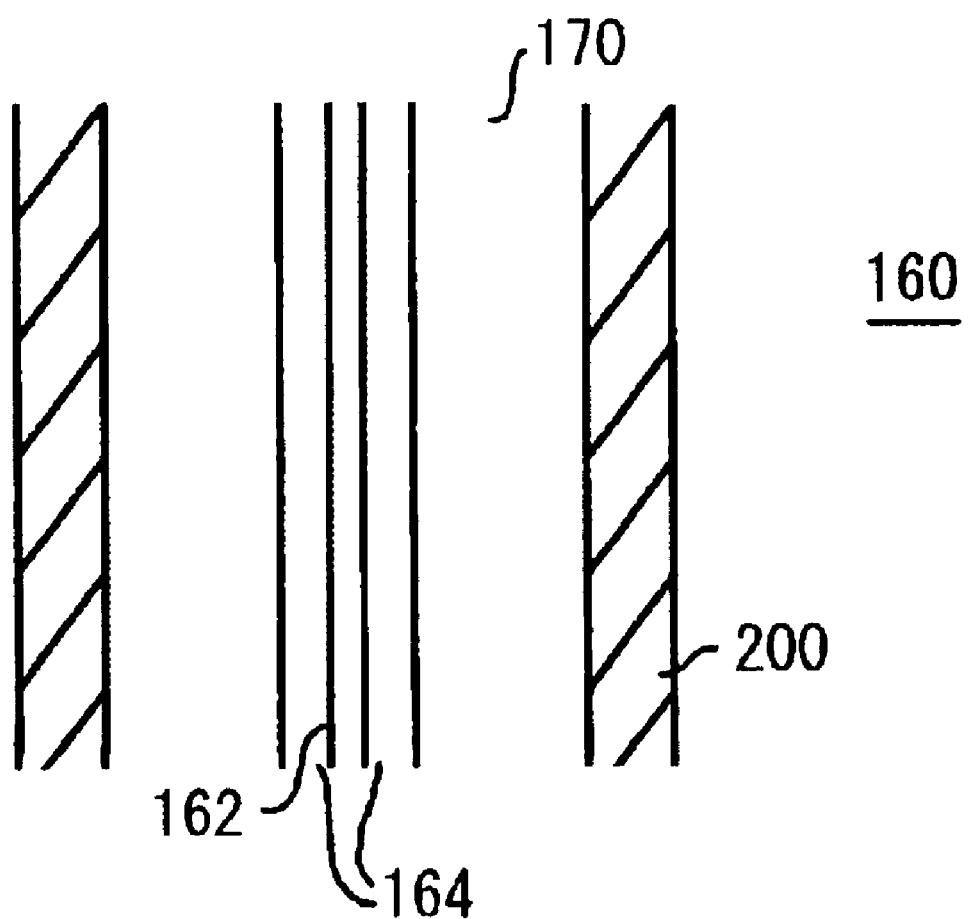
FIG. 19 is a schematic explanatory view of the probe with a scattering layer having a capillary protection layer.

In the event that there is a need to reinforce the strength of the probe against bending, a capillary protective layer 200 is preferably provided external to the scattering layer 170 as shown in FIG. 19. The protective layer 200 can be for example a metal capillary tube, a resin capillary tube, etc.

As an experimental example, the background was measured in the illumination-collection mode, using the above-described probe and the conventional probe. A probe was fabricated and attached to the near-field optical microscope for measurement. The probe had a scattering layer made of glycerin (refractive index: 1.52), adjacent externally to the glass fiber cladding layer (refractive index: 1.5) in the region up to 5 mm from the glass fiber end from which the incident light is introduced. On the other hand, a commercially available probe was prepared and attached to the near-field optical microscope for measurement. The probe had a protective coating layer made of an UV-cured resin (refractive index: 1.4), adjacent externally to the glass fiber cladding layer. The results of the respective measurements are shown in FIGS. 20A and 20B.

Figure 20:
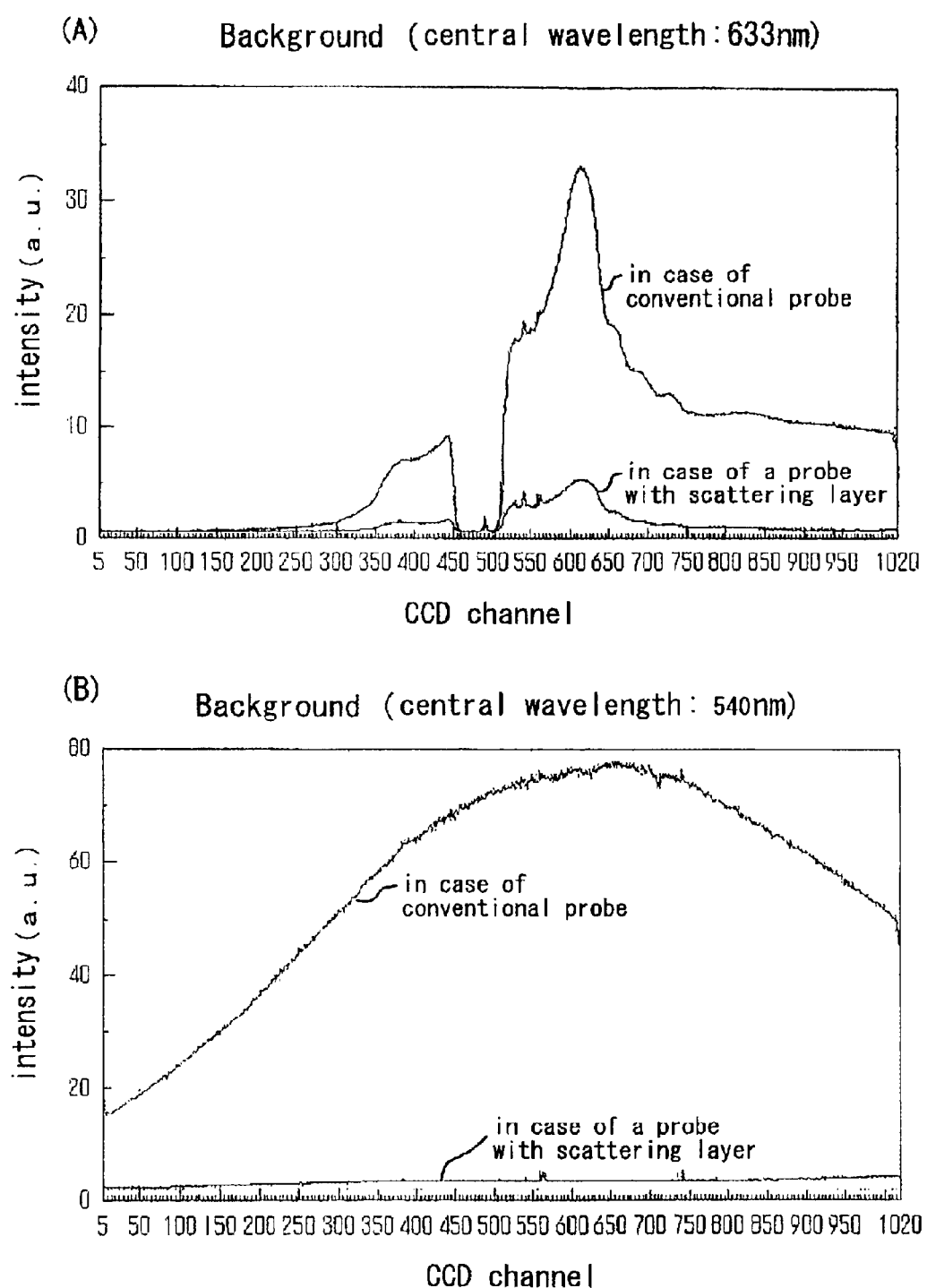
FIGS. 20A and 20B are graphical representations of the background measured using the probe with a scattering layer and the conventional probe, respectively.

It will be apparent from FIGS. 20A and 20B that use of the probe having the scattering layer remarkably reduces the background.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A probe opening fabricating apparatus for creating an opening with desired dimensions at a mask tip of a near-field optical microscope probe, said probe including a core made of a material having a light transmission property and a mask formed on a surface of said core and made of a material having a ductility and a light shielding property said apparatus comprising:

a light source;

reflection means having an abutting surface which comes into abutment against said tip, said abutting surface reflecting incident light from said light source, directed via said core to said opening;

light detection means for detecting the quantity of light of reflected light from a site where said tip abuts against said reflection means;

press means for pressing said tip against said reflection means along the direction of the optical axis;

storage means for storing in advance calibration information on the quantity of light of said reflected light and the dimensions of said opening;

calculation means for figuring out the quantity of light of said reflected light for the acquisition of said opening with desired dimensions, from said calibration information stored in said storage means; and press control means for controlling pressing of said probe tip against said reflector means in the direction of the optical axis, effected by said press means, so as to allow the quantity of light of said reflected light detected by said light detection means to become equal to the quantity of light figured out by said calculation means.

2. A near-field optical microscope having a probe opening fabricating apparatus according to claim 1, said near-field optical microscope acquiring information on a surface to be measured of a sample by (a) an illumination-collection mode in which evanescent light is illuminated on said surface to be measured of said sample, said evanescent light emerging from an opening at a probe tip which has said opening created by said opening fabricating apparatus, the resultant scattered light or reflected light being collected trough said opening; or (b) an illumination mode in which evanescent light is illuminated on said surface to be measured of said sample, said evanescent light emerging from said opening at said probe tip which has said opening created by said opening fabricating apparatus, the resultant scattered light or reflected light being collected through an external optical system; or (c) a collection mode in which a field of said evanescent light appearing on said surface to be measured of said sample is scattered by said probe tip which has said opening created by said opening fabricating apparatus the resultant scattered light being collected through said opening.

3. The near-field optical microscope according to claim 2, further comprising:

an opening diameter checking mechanism for checking the dimensions of an opening at said probe tip where said opening is formed, said opening diameter checking mechanism comprising:

a light source;

reflection means having an abutting surface which comes into abutment against said tip, said abutting surface reflecting incident light from said light source, directed via said core to said opening;

light detection means for detecting the quantity of light of reflected light from a site where said tip abuts against said reflection means;

press means for pressing said tip against said reflection means along the direction of the optical axis;

storage means for storing in advance calibration information on the quantity of light of said reflected light and the dimensions of said opening, and comparison means for collating the quantity of light of said reflected light detected by said light detection means with said calibration information stored in said storage means, to thereby find the dimensions of said opening at said probe tip.

4. The near-field optical microscope according to claim 3, further comprising:

an opening diameter adjusting mechanism for altering the dimensions of an opening at said probe tip where said opening is formed, said opening diameter adjusting mechanism comprising:

a light source;

reflection means having an abutting surface which comes into abutment against said tip, said abutting surface reflecting incident light from said light source, directed via said core to said opening;

light detection means for detecting the quantity of light of reflected light from a site where said tip abuts against said reflection means;

press means for pressing said tip against said reflection means in the direction of the optical axis;

storage means for storing in advance calibration information on the quantity of light of said reflected light and the dimensions of said opening;

setting means for setting desired dimensions of said opening at said probe tip;

calculation means for figuring out the quantity of light of said reflected light for the acquisition of said opening having dimensions set by said setting means, from said calibration information stored in said storage means; and press control means for controlling pressing of said probe tip against said reflection means in the direction of the optical axis effected by said press means, so as to allow the quantity of light of said reflected light detected by said light detection means to become equal to the quantity of light figured out by said calculation means.

5. The near-field optical microscope, according to claim 4, wherein said probe is formed from glass fiber, said probe including a scattering layer adjacent externally to a cladding layer of said glass fiber, said scattering layer having a refractive index substantially equal to the refractive index of said cladding layer.

* * * * *